(No Model.)
H. J. BREWER.
GALVANIC BATTERY.
No. 323,904. Patented Aug. 11, 1885.
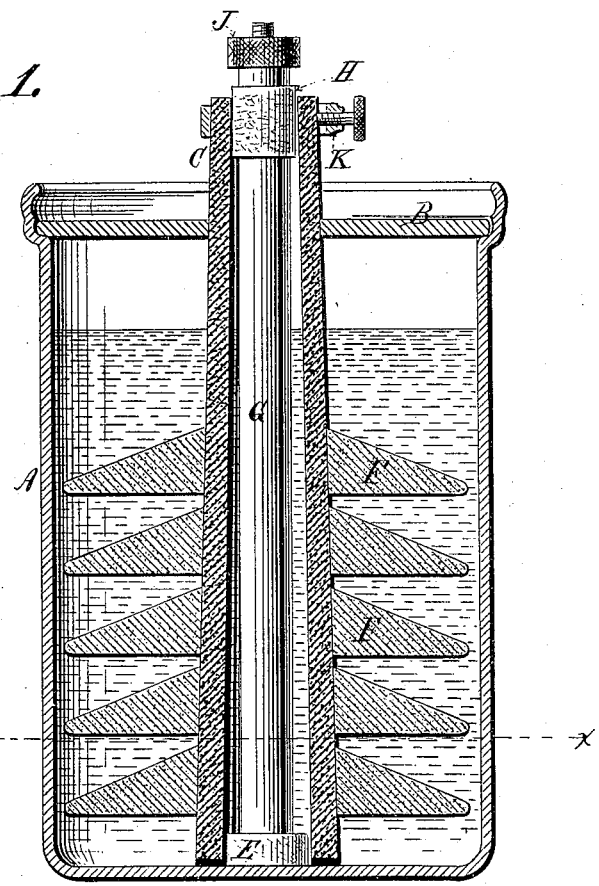
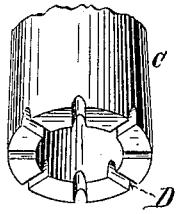
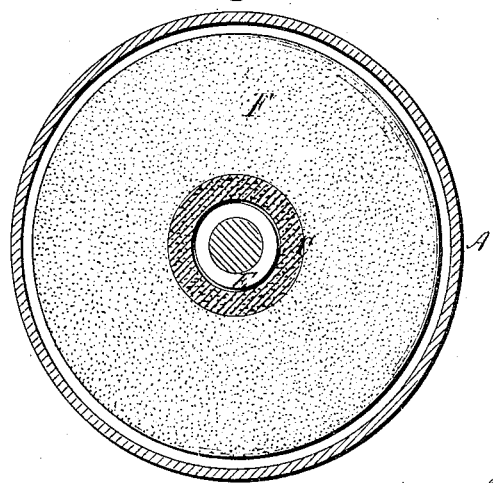
Witnesses:
Geo. W. Miatt
Hn Gardner
Inventor:
Horatio J. Brewer
By his Attorney
E. N. Dickerson Jr.

UNITED STATES PATENT OFFICE.

HORATIO J. BREWER, OF NEW YORK, N. Y.

GALVANIC BATTERY.

SPECIFICATION forming part of Letters Patent No. 323,904, dated August 11, 1885.

Application filed March 16, 1885. (No model.)

*To all whom it may concern:*

Be it known that I, HORATIO J. BREWER, of the city, county, and State of New York, have invented a new and useful Improvement in Galvanic Batteries, of which the following is a full, true, and exact description, reference being had to the accompanying drawings.

This invention relates to an improvement on the carbon-zinc battery, and is especially designed for a battery in which a strong electro-negative element is employed in combination with carbon, though this is not essential to my invention. In this battery the zinc is placed within a hollow carbon.

My invention will be readily understood from the accompanying drawings, in which Figure 1 represents a vertical section; Fig. 2, a horizontal section through Fig. 1 on the line $x\,x$; Fig. 3, a bottom view of my hollow carbon.

My battery consists of a suitable cup, A, closed by the cover B. These parts may be of any suitable shape, and the cover is not essential, though I prefer to use it. The carbon element is shown at C, and it consists of a hollow conical body cut off at the ends. The lower end of this carbon rod may be provided with channels D, allowing the circulation of the liquid beneath it. Surrounding this conical element C are the conical disks F. These are made in sizes, so as to fit one above the other upon the conical carbon C, and, having themselves conical holes within them, can be forced into firm contact with the hollow rod C. These bodies I by preference make strongly electro-negative, using the well-known Leclanché compound of peroxide of manganese; but I may use any other material, and I may, if desired, use simply the ordinary carbon conglomerate of which ordinary carbons are made. The zinc element is shown at G, and passes downward through the hollow rod C. It is prevented from contact therewith by a suitable washer, H, at its upper end, and a suitable washer, E, at its lower end, made of any suitable material. A suitable binding-screw, J, is provided at the upper end of the zinc, and a suitable binding-screw, K, at the upper end of the carbon. As shown, the elements are supported by the cover B.

My battery is to be charged with any suitable exciting-fluid, preferably a solution of sal-ammoniac. This solution gets access to the zinc through the channels D at the bottom of the hollow carbon rod, and is in immediate proximity to the carbon, as shown, thereby making a very low internal resistance, while the electro-motive force may be made high by using stronger electro-negative disks F outside of the hollow carbon. It will be observed, likewise, that if the electro-negative disks F become worn out they can be readily replaced by new ones, and that this battery is very simple and cheap in its construction. It is plain, likewise, that the disks F may be dispensed with, though thereby the efficiency of the battery would be somewhat impaired. If desired, likewise, the hollow rod C might be made of some other carbon conglomerate besides that specified.

What I claim as my invention, and desire to secure by Letters Patent, is—

1. The electro-negative element for galvanic batteries shown, which consists in the combination of a hollow carbon having a slightly-conical exterior surface with the electro-negative disks having corresponding internal apertures fitted thereto, substantially as described.

2. The combination of the hollow carbon having a tapering exterior, and provided with channels at the bottom, electro-negative disk fitting the exterior of said carbon, a zinc electrode inside the carbon, and insulating-washers between the zinc and carbon, substantially as described.

3. The combination of the zinc rod G, hollow carbon C, and the electro-negative disks F, attached thereto, substantially as described.

HORATIO J. BREWER.

Witnesses:
GEO. H. EVANS,
WM. A. POLLOCK.